(12) United States Patent
Tripp

(10) Patent No.: US 6,315,209 B1
(45) Date of Patent: Nov. 13, 2001

(54) MIXING VALVE

(75) Inventor: Dale S. Tripp, No. Andover, MA (US)

(73) Assignee: Watts Regulator Company, No. Andover, MA (US)

( * ) Notice: Subject to any disclaimer, the term of this patent is extended or adjusted under 35 U.S.C. 154(b) by 0 days.

(21) Appl. No.: 09/516,724

(22) Filed: Mar. 1, 2000

(51) Int. Cl.⁷ .................................................. G05D 23/13
(52) U.S. Cl. .................................. 236/12.16; 236/12.13; 236/12.2
(58) Field of Search ................................ 236/12.13, 12.2, 236/12.16; 137/597

(56) References Cited

U.S. PATENT DOCUMENTS

| | | |
|---|---|---|
| 1,891,926 | 12/1932 | Hall . |
| 1,932,404 | 10/1933 | Hamblin . |
| 2,115,502 | 4/1938 | Vernet . |
| 2,259,846 | 10/1941 | Vernet et al. . |
| 2,296,128 | 9/1942 | Weingarten . |
| 2,368,181 | 1/1945 | Vernet . |
| 2,396,138 | 3/1946 | Vernet . |
| 2,606,717 | 8/1952 | Barker . |
| 2,656,981 | 10/1953 | Schoerner . |
| 2,827,238 | 3/1958 | Barker . |
| 3,001,401 | 9/1961 | Vernet et al. . |
| 3,001,717 * | 9/1961 | Rimsha et al. ..................... 236/12.14 |
| 3,129,723 | 4/1964 | Straka . |
| 3,921,658 | 11/1975 | Botnick . |
| 4,685,156 | 8/1987 | Brabazon . |
| 4,875,437 | 10/1989 | Cook et al. .......................... 123/411 |
| 4,980,933 | 1/1991 | Tsutsui et al. . |
| 5,551,473 | 9/1996 | Lin et al. . |
| 5,988,514 * | 11/1999 | Huang ............................... 236/12.14 |
| 6,021,952 * | 2/2000 | Antoniello et al. ............... 236/12.16 |

FOREIGN PATENT DOCUMENTS

| | | |
|---|---|---|
| 0566433B1 | 3/1993 | (EP) . |
| 0936524A1 | 8/1999 | (EP) . |

OTHER PUBLICATIONS

Watts Brochure, Hot Water Extender Tempering Valves, 1995, 8 pages.
Watts Brochure, The MMV Thermostatic Mixing Valve Series, 1996, 2 pages.
Watts Brochure, The Watts Model L111 Thermostatic Mixing Valve, 1997, 2 pages.
Watts Brochure, The 1170 Temperature Control Valve, 1998, 2 pages.

* cited by examiner

Primary Examiner—William Doerrler
Assistant Examiner—Mohammad M. Ali
(74) Attorney, Agent, or Firm—Fish & Richardson P.C.

(57) ABSTRACT

A mixing valve includes a manifold defining a hot fluid inlet, a cold fluid inlet, a temperature-controlled fluid outlet, and a cold fluid outlet. The cold fluid inlet is in fluid communication with the cold fluid outlet, and the cold fluid inlet and the hot fluid inlet are in fluid communication with the temperature-controlled fluid outlet. The manifold further defines a mixing chamber for mixing of cold fluid from the cold fluid inlet and hot fluid from the hot fluid inlet. Mixed fluid from the mixing chamber is delivered to the temperature-controlled fluid outlet. A temperature-controlled device associated with the hot fluid inlet controls the volume of flow from the hot fluid inlet to the mixing chamber. The mixing valve further includes a one-way check valve located between the hot fluid inlet and the cold fluid outlet for limiting flow of hot fluid to the cold fluid outlet.

19 Claims, 3 Drawing Sheets

MIXING VALVE

BACKGROUND OF THE INVENTION

This invention relates to a mixing valve for supplying fluid to a temperature-controlled fluid outlet and a cold fluid outlet.

Mixing valves for supplying tempered water to, for example, a hot water faucet, are known. Typically, cold water from a supply source flows directly to a cold water faucet and to a cold water inlet of the mixing valve. Hot water from a supply source flows to a hot water inlet of the mixing valve. The cold and hot water are mixed in the valve, with the tempered water flowing through an outlet of the mixing valve to the hot water faucet.

SUMMARY OF THE INVENTION

According to one aspect of the invention, a mixing valve for supplying fluid to a temperature-controlled fluid outlet and a cold fluid outlet includes a manifold defining a hot fluid inlet, a cold fluid inlet, a temperature-controlled fluid outlet, and a cold fluid outlet. The cold fluid inlet is in fluid communication with the cold fluid outlet, and the cold fluid inlet and the hot fluid inlet are in fluid communication with the temperature-controlled fluid outlet. The manifold further defines a mixing chamber for mixing of cold fluid from the cold fluid inlet and hot fluid from the hot fluid inlet. Mixed fluid from the mixing chamber is delivered to the temperature-controlled fluid outlet. A temperature-controlled device associated with the hot fluid inlet controls the volume of flow from the hot fluid inlet to the mixing chamber.

Embodiments of this aspect of the invention may include one or more of the following features. The temperature-controlled device limits flow of hot fluid to the mixing chamber upon a rise of fluid temperature within the mixing chamber above a predetermined level. The mixing valve includes an adjustment element for setting the predetermined level. The adjustment element includes a threaded region for threaded coupling to the manifold. The temperature-controlled device includes a thermostat.

The mixing valve includes a one-way check valve located between the hot fluid inlet and the cold fluid outlet for limiting flow of hot fluid to the cold fluid outlet. The temperature-controlled device includes a sealing surface, and the manifold includes a valve seat. The sealing surface engages the valve seat upon a rise of fluid temperature within the mixing chamber above the predetermined level to limit flow of hot fluid to the mixing chamber. The temperature-controlled device includes a thermostat responsive to changes in temperature to control a position of the sealing surface relative to the valve seat.

The manifold has an H-shaped configuration. The cold fluid inlet and the cold fluid outlet are located along a first leg of the H-shaped configuration, and the hot fluid inlet and the temperature-controlled fluid outlet are located along a second leg of the H-shaped configuration. The manifold includes hose couplings defining the inlets and outlets.

According to another aspect of the invention, the mixing valve includes a manifold defining a hot fluid inlet, a cold fluid inlet, a temperature-controlled fluid outlet, and a cold fluid outlet. The cold fluid inlet is in fluid communication with the cold fluid outlet, and the cold fluid inlet and the hot fluid inlet are in fluid communication with the temperature-controlled fluid outlet. The manifold further defines a mixing chamber for mixing of cold fluid from the cold fluid inlet and hot fluid from the hot fluid inlet. Mixed fluid from the mixing chamber is delivered to the temperature-controlled fluid outlet. A one-way check valve located between the hot fluid inlet and the cold fluid outlet limits flow of hot fluid to the cold fluid outlet.

According to another aspect of the invention, a method of supplying temperature-controlled fluid and cold fluid includes supplying cold fluid to a cold fluid inlet of a manifold; supplying hot fluid to a hot fluid inlet of a manifold; delivering cold fluid from the cold fluid inlet to a cold fluid outlet of the manifold; mixing hot fluid and cold fluid in a mixture chamber defined by the manifold; controlling the volume of flow of hot fluid to the mixing chamber to limit flow of hot fluid to the mixing chamber upon a rise of fluid temperature within the mixing chamber above a predetermined level; and delivering mixed fluid below the predetermined level to the temperature-controlled fluid outlet.

Embodiments of this aspect of the invention may include one or more of the following features: Controlling the volume of flow of hot fluid by engaging a sealing surface upon a valve seat upon the rise of fluid temperature within the mixing chamber above the predetermined level; adjusting an adjustment element to select the predetermined level of fluid temperature within the mixing chamber; and/or limiting flow of hot fluid to the cold fluid outlet, e.g., by locating a one-way check valve between the hot fluid inlet and the cold fluid outlet.

According to another aspect of the invention, a method of supplying temperature-controlled fluid and cold fluid includes supplying cold fluid to a cold fluid inlet of a manifold; supplying hot fluid to a hot fluid inlet of a manifold; delivering cold fluid from the cold fluid inlet to a cold fluid outlet of the manifold; mixing hot fluid and cold fluid in a mixing chamber defined by the manifold; delivering mixed fluid to the temperature-controlled fluid outlet; and limiting flow of hot fluid to the cold fluid outlet, e.g., by locating a one-way check valve between the hot fluid inlet and the cold fluid outlet.

The invention thus provides a mixing valve, for example, for use with hot and cold water faucets of a sink, to deliver hot and cold water, with the hot water being delivered at a predetermined maximum temperature. The risk of scalding or burns from hot water is thus reduced. The invention also provides a mixing valve having a one-piece design for convenient installation.

These and other features and advantages of the invention will be apparent from the following description of a presently preferred embodiment, and from the claims.

DESCRIPTION OF THE PREFERRED EMBODIMENT

Figure 1:
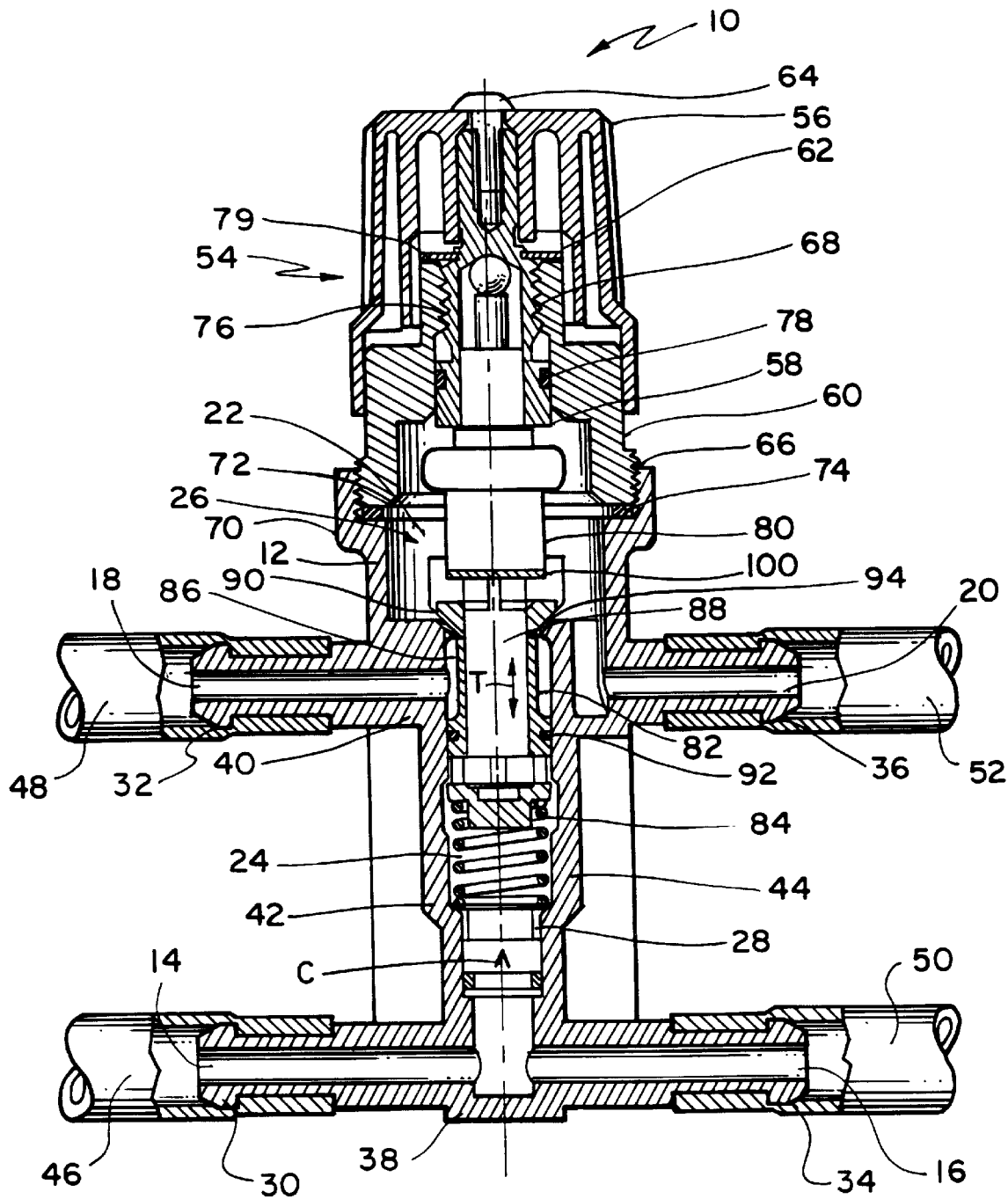
FIG. 1 is a side section view of the mixing valve of the invention shown in a closed position.
Figure 2:
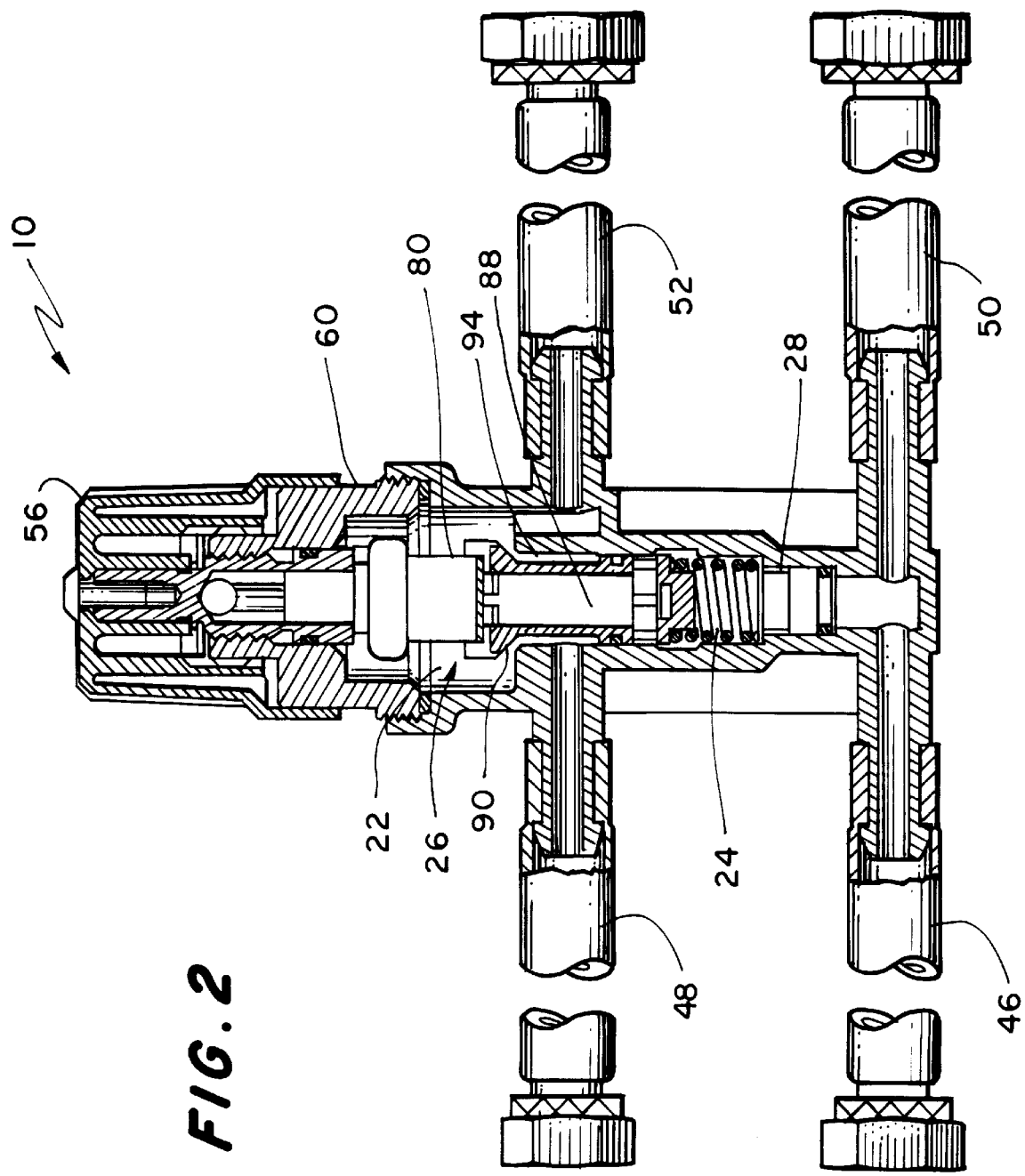
FIG. 2 is a side section view of the mixing valve of the invention shown in an open position.
Figure 3:
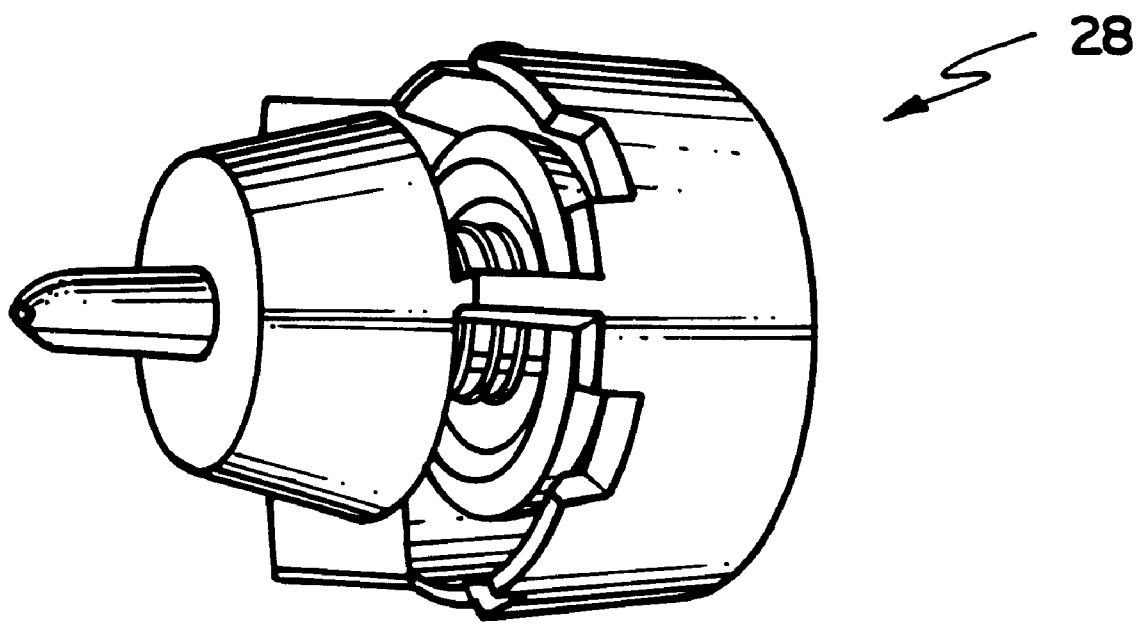
FIG. 3 is a view of a check valve of the mixing valve.

Referring to FIGS. 1 and 2, a mixing valve 10 is used to deliver hot and cold water to, e.g., hot and cold water faucets of a sink, with the hot water being delivered at a predetermined maximum temperature, e.g., 103° F. Mixing valve 10 includes a manifold 12 formed of, e.g., bronze, defining a cold fluid inlet 14, a cold fluid outlet 16, a hot fluid inlet 18, and a temperature-controlled fluid outlet 20. Manifold 12 further defines a mixing chamber 22 and a passageway 24 for flow of cold fluid to mixing chamber 22. Cold fluid from cold fluid inlet 14 and hot fluid from hot fluid inlet 18 are mixed in mixing chamber 22. Located within mixing chamber 22 is a temperature-controlled device 26, e.g., as available from Wax Thermostatic Element, Vernet 91291 Arpajon Cedex, France 1990. Wax thermostatic elements are described also in Vernet, U.S. Pat. No. 2,396,138, the entire disclosure of which incorporated herein by reference. Temperature-controlled device 26 is associated with hot fluid inlet 18 for controlling the flow of hot fluid from hot fluid inlet 18 to mixing chamber 22. Mixed fluid from mixing chamber 22 is delivered to temperature-controlled fluid outlet 20. Cold fluid is delivered directly from cold fluid inlet 14 to cold fluid outlet 16. Located within passageway 24 is a one-way check module 28, as shown in FIG. 3 for example. Check module 28 allows cold fluid to flow to mixing chamber 22 while restricting fluid from hot fluid inlet 18 and mixing chamber 22 from flowing to cold fluid outlet 16.

Manifold 12 includes hose couplings 30, 32 defining inlets 14, 18, respectively, and hose couplings 34, 36 defining outlets 16, 20, respectively. Manifold 12 has an H-shaped configuration with couplings 30, 34 defining a first leg 38, couplings 32, 36 defining a second leg 40, and a conduit 42 defining passageway 24 forming the cross-leg 44. Attached to inlet couplings 30, 32 are supply hoses 46, 48, respectively, and attached to outlet couplings 34, 36 are delivery hoses 50, 52, respectively.

Mixing valve 10 includes an adjustment element 54 which acts upon temperature-controlled device 26 to set the predetermined maximum temperature value of fluid exiting mixing valve 10 at temperature-controlled fluid outlet 20. Adjustment element 54 includes an adjustment cap 56, a stem 58, an adapter 60, and a stop ring 62. Cap 56 is fixed to stem 58 with a screw 64. Adapter 60 has a first threaded region 66 and a second threaded region 68. Manifold 12 has an extension 70 with a threaded region 72 for engaging first threaded region 66 of adapter 60 to attach adjustment element 54 thereto. A gasket 74 provides a fluid tight seal between extension 70 and adapter 60. Stem 58 has an outer threaded surface 76 that engages second threaded region 68 of adapter 60. An O-ring 78 provides a sliding seal between stem 58 and adapter 60. Rotation of cap 56 causes stem 58 to move vertically relative to adapter 60 acting upon temperature-controlled device 26 to set the predetermined maximum temperature. To prevent damage to temperature-controlled device 26, stop ring 62 is attached to stem 58 to restrict stem 58 from moving too far down by acting against top surface 79 of adapter 60.

Temperature-controlled device 26 includes a thermostat 80, a piston 82, and a spring 84, which biases piston 82 toward its open position, acting against thermostat 80. Piston 82 defines a hot fluid flow channel 86, a cold fluid flow channel 88, and a sealing surface 90. An O-ring 92 provides a sliding seal between hot fluid flow channel 86 and passageway 24. Manifold 12 includes a valve seat 94 against which sealing surface 90 mates when no flow of hot fluid to mixing chamber 22 is desired. Thermostat 80 is responsive to the temperature of water in the mixing chamber 22 and expands or contracts axially (arrow, T) with the temperature of the water in mixing chamber 22 to increase or decrease (or close) the spacing between sealing surface 90 and valve seat 94, thereby controlling the amount of hot fluid delivered to mixing chamber 22 and thus the temperature of the fluid delivered to the temperature-controlled fluid outlet 20. Disc 100 is a metal washer used to distribute load of thermostat 80 evenly.

In operation, when the cold-water faucet is turned on, cold water from cold fluid inlet 14 flows to cold fluid outlet 16. When the hot water faucet is turned on, cold water from cold fluid inlet 14 flows (arrow, C), via one-way check module 28 through passageway 24 and cold fluid channel 88 into mixing chamber 22. Hot water from hot fluid inlet 14 flows into mixing chamber 22 through hot fluid channel 86 and between sealing surface 90 and seat 94. The hot and cold water are mixed in mixing chamber 22, and temperature-controlled water is delivered to temperature-controlled fluid outlet 20. The temperature of water flowing from temperature-controlled fluid outlet 20 is set to a predetermined maximum level, e.g., 103° F., by setting adjustment element 54 so that axial expansion of thermostat 80 causes sealing surface 90 to engage in sealing contact upon valve seat 94, thus to stop flow of hot water, if the water temperature in the mixing chamber reaches the predetermined maximum level. Temperature-controlled device 26 adjusts the position between sealing surface 90 and seat 94 to regulate flow of hot fluid into mixing chamber 22 to maintain the temperature of the temperature controlled fluid at the desired temperature, i.e., below the predetermined maximum level. Hot water is restricted by check module 28 from flowing to cold fluid outlet 16.

Under abnormal flow pressure conditions, e.g., if cold water flow to mixing chamber 22 is substantially reduced or stopped, thermostat 80, in response to the high temperature of the fluid in mixing chamber 22 relative to the predetermined level, engages sealing surface 90 upon valve seat 94 to reduce or stop flow of hot water toward mixing chamber 22. Mixing valve assembly 10 thus resists flow of temperature-controlled water toward the hot water faucet over the predetermined temperature.

Other embodiments are within the scope of the following claims.

What is claimed is:

1. A mixing valve, comprising:

a manifold defining a hot fluid inlet, a cold fluid inlet, a temperature-controlled fluid outlet, and a cold fluid outlet, the cold fluid inlet being in fluid communication with the cold fluid outlet, the cold fluid inlet and the hot fluid inlet being in fluid communication with the temperature-controlled fluid outlet, the manifold further defining a mixing chamber for mixing of cold fluid from the cold fluid inlet and hot fluid from the hot fluid inlet, mixed fluid from the mixing chamber being delivered to the temperature-controlled fluid outlet, and a temperature-controlled device associated with the hot fluid inlet for controlling the volume of flow from the hot fluid inlet to the mixing chamber.

2. The mixing valve of claim 1, wherein the temperature-controlled device is configured to limit flow of hot fluid to the mixing chamber upon a rise of fluid temperature within the mixing chamber above a predetermined level.

3. The mixing valve of claim 2, further comprising an adjustment element for setting the predetermined level.

4. The mixing valve of claim 3, wherein the adjustment element includes a threaded region for threaded coupling to the manifold.

5. The mixing valve of claim 1, wherein the temperature-controlled device includes a thermostat.

6. The mixing valve of claim 1, further comprising a one-way check valve located between the hot fluid inlet and the cold fluid outlet for limiting flow of hot fluid to the cold fluid outlet.

7. The mixing valve of claim 1, wherein the temperature-controlled device includes a sealing surface and the manifold includes a valve seat, the sealing surface engaging the valve seat upon a rise of fluid temperature within the mixing chamber above a predetermined level to limit flow of hot fluid to the mixing chamber.

8. The mixing valve of claim 7, wherein the temperature-controlled device includes a thermostat responsive to changes in temperature to control a position of the sealing surface relative to the valve seat.

9. The mixing valve of claim 1, wherein the manifold has an H-shaped configuration, the cold fluid inlet and the cold fluid outlet being located along a first leg of the H-shaped configuration and the hot fluid inlet and the temperature-controlled fluid outlet being located along a second leg of the H-shaped configuration.

10. The mixing value of claim 1, wherein the manifold includes hose couplings defining the inlets and outlets.

11. A mixing valve, comprising:

a manifold defining a hot fluid inlet, a cold fluid inlet, a temperature-controlled fluid outlet, and a cold fluid outlet, the cold fluid inlet being in fluid communication with the cold fluid outlet, the cold fluid inlet and the hot fluid inlet being in fluid communication with the temperature-controlled fluid outlet, a mixing chamber configured for mixing cold fluid from the cold fluid inlet and hot fluid from the hot fluid inlet, mixed fluid from the mixing chamber being delivered to the temperature-controlled fluid outlet, a one-way check valve located between the hot fluid inlet and the cold fluid outlet for limiting flow of hot fluid to the cold fluid outlet, and a temperature-controlled device for limiting flow of hot fluid to the mixing chamber upon a rise of fluid temperature within the mixing chamber above a predetermined level, the temperature-controlled device including a thermostat responsive to changes in temperature, and an adjustment element for setting the predetermined level.

12. A mixing valve, comprising:

a manifold defining a hot fluid inlet, a cold fluid inlet, a temperature-controlled fluid outlet, and a cold fluid outlet, the cold fluid inlet being in fluid communication with the cold fluid outlet, the cold fluid inlet and the hot fluid inlet being in fluid communication with the temperature-controlled fluid outlet, the manifold further defining a mixing chamber for mixing of cold fluid from the cold fluid inlet and hot fluid from the hot fluid inlet, mixed fluid from the mixing chamber being delivered to the temperature-controlled fluid outlet, and a one-way check valve located between the hot fluid inlet and the cold fluid outlet for limiting flow of hot fluid to the cold fluid outlet.

13. A method of supplying temperature-controlled fluid and cold fluid, comprising:

supplying cold fluid to a cold fluid inlet of a manifold;

supplying hot fluid to a hot fluid inlet of a manifold;

delivering cold fluid from the cold fluid inlet to a cold fluid outlet of the manifold;

mixing hot fluid and cold fluid in a mixture chamber defined by the manifold;

controlling the volume of flow of hot fluid to the mixing chamber to limit flow of hot fluid to the mixing chamber upon a rise of fluid temperature within the mixing chamber above a predetermined level; and delivering mixed fluid to the temperature-controlled fluid outlet.

14. The method of claim 13, wherein controlling the volume of flow of hot fluid includes engaging a sealing surface upon a valve seat upon the rise of fluid temperature within the mixing chamber above the predetermined level.

15. The method of claim 13, further comprising adjusting an adjustment element to select the predetermined level of fluid temperature within the mixing chamber.

16. The method of claim 13, further comprising limiting flow of hot fluid to the cold fluid outlet.

17. The method of claim 16, wherein the step of limiting flow includes locating a one-way check valve between the hot fluid inlet and the cold fluid outlet.

18. A method of supplying temperature-controlled fluid and cold fluid, comprising:

supplying cold fluid to a cold fluid inlet of a manifold;

supplying hot fluid to a hot fluid inlet of a manifold;

delivering cold fluid from the cold fluid inlet to a cold fluid outlet of the manifold;

mixing hot fluid and cold fluid in a mixing chamber defined by the manifold;

delivering mixed fluid to the temperature-controlled fluid outlet; and limiting flow of hot fluid to the cold fluid outlet.

19. The method of claim 18, wherein the step of limiting flow includes locating a one-way check valve between the hot fluid inlet an the cold fluid outlet.

* * * * *